US007789651B2

(12) United States Patent
Johnson

(10) Patent No.: US 7,789,651 B2
(45) Date of Patent: *Sep. 7, 2010

(54) PRESNEL LENS ANGULAR SEGMENT MANUFACTURING APPARATUS AND METHOD

(75) Inventor: Neldon P. Johnson, Salem, UT (US)

(73) Assignee: N. P. Johnson Family Limited Partnership, Salem, UT (US)

( * ) Notice: Subject to any disclaimer, the term of this patent is extended or adjusted under 35 U.S.C. 154(b) by 106 days.

This patent is subject to a terminal disclaimer.

(21) Appl. No.: 11/827,399

(22) Filed: Jul. 11, 2007

(65) Prior Publication Data

US 2008/0150189 A1 Jun. 26, 2008

Related U.S. Application Data

(63) Continuation-in-part of application No. 11/644,233, filed on Dec. 22, 2006.

(51) Int. Cl.
*B29C 31/00* (2006.01)
*B28B 11/10* (2006.01)
*B29C 43/26* (2006.01)
*B29D 11/00* (2006.01)

(52) U.S. Cl. ............... 425/343; 425/363; 425/385; 264/1.6; 264/2.7

(58) Field of Classification Search ........... 264/1.1–2.7, 264/284; 425/363, 367, 327, 343, 194, 808; 156/209

See application file for complete search history.

(56) References Cited

U.S. PATENT DOCUMENTS

| 1,954,636 | A | * | 4/1934 | Lilienfeld | 361/510 |
| 3,146,492 | A | | 9/1964 | Lemelson | 18/10 |
| 3,348,264 | A | | 10/1967 | Rice et al. | 18/10 |
| 3,828,666 | A | * | 8/1974 | Apicella | 101/24 |
| 4,272,471 | A | * | 6/1981 | Walker | 264/104 |
| 4,528,148 | A | | 7/1985 | Dotti | 264/1.5 |
| 5,174,845 | A | * | 12/1992 | Petty | 156/184 |
| 5,336,076 | A | | 8/1994 | Waldherr et al. | 425/294 |
| 5,643,400 | A | * | 7/1997 | Bernard et al. | 156/500 |
| 5,656,209 | A | | 8/1997 | Benz et al. | 264/1.6 |
| 5,759,455 | A | * | 6/1998 | Kamitakahara et al. | 264/1.34 |
| 5,770,122 | A | * | 6/1998 | Curchod | 264/2.7 |
| 5,870,233 | A | | 2/1999 | Benz et al. | 359/742 |
| 5,958,309 | A | * | 9/1999 | Fujii et al. | 264/1.6 |
| 6,062,844 | A | * | 5/2000 | Biro | 425/327 |
| 6,282,932 | B1 | * | 9/2001 | Surina et al. | 72/7.6 |
| 6,628,460 | B1 | * | 9/2003 | Ookawa et al. | 359/455 |
| 6,678,097 | B2 | | 1/2004 | McKenney | 359/742 |
| 6,693,748 | B1 | | 2/2004 | Fujimoto et al. | 359/621 |
| 6,726,859 | B2 | | 4/2004 | Suzuki et al. | 264/2.5 |
| 2002/0197346 | A1 | * | 12/2002 | Papadopoulos | 425/194 |
| 2003/0006535 | A1 | * | 1/2003 | Hennessey et al. | 264/403 |
| 2004/0051948 | A1 | * | 3/2004 | Reed | 359/529 |
| 2004/0135273 | A1 | * | 7/2004 | Parker et al. | 264/2.5 |

(Continued)

*Primary Examiner*—Joseph S Del Sole
*Assistant Examiner*—Nahida Sultana
(74) *Attorney, Agent, or Firm*—J. David Nelson

(57) ABSTRACT

A roller extruder for manufacturing Fresnel lens angular segments from raw plastic, the roller extruder having a blank roller and a die roller positioned a desired roller clearance from the blank roller, the die roller having two peripheral lens dies with an angular displacement between the lens dies increasing linearly from a die junction at the inside roller edge to approximately one hundred eighty degrees at the outside roller edge, and the die roller having peripheral Fresnel facet dies.

40 Claims, 10 Drawing Sheets

U.S. PATENT DOCUMENTS

2004/0136079 A1* 7/2004 Goggins .................... 359/619
2005/0280182 A1* 12/2005 Boegli ....................... 264/284
2006/0263463 A1* 11/2006 Clune et al. ................ 425/363
2007/0122517 A1* 5/2007 Herrera ..................... 425/363
2008/0241305 A1* 10/2008 Fiedler ...................... 425/367

* cited by examiner

FRESNEL LENS ANGULAR SEGMENT MANUFACTURING APPARATUS AND METHOD

CROSS REFERENCE TO RELATED APPLICATION

This application is a continuation-in-part application for U.S. patent application Ser. No. 11/644,233 which was filed on Dec. 22, 2006. Upon the receipt and acceptance of the present application by the United States Patent and Trademark Office for prosecution, it is the intent of the Applicant to abandon the prior application and to prosecute only the present application.

BACKGROUND OF THE INVENTION

This invention is in the field of apparatuses and methods for manufacturing Fresnel lenses and in particular apparatuses and methods for extruding Fresnel lens angular segments from plastic.

Processes for extruding sheet plastic from raw plastic material such as ingots and pellets and the like are well known in the industry. Similarly, processes for extruding Fresnel lenses from plastic through the use of heat and roller equipment for the extrusion process and dies for impressing the facet grooves on the face of the lens are known in the industry.

The use of Fresnel lenses for solar collectors is also known in the industry. Economic, operational, and maintenance considerations dictate that the use of a larger collector for solar collection applications is desirable. When a Fresnel lens is to be used for a solar collector, this usually dictates that the solar collector cannot be constructed of a single lens. Also, in the manufacturing of the Fresnel lens, ordinarily a size limitation is dictated by the size of the rollers that are used for the production of the Fresnel lens. This then requires that a solar collector be constructed from a composite of Fresnel lens components. It is also found that the use of a generally circular shape for a Fresnel lens is desirable for solar collector applications. Because of facet groove orientation limitations and geometric sizing and shape limitations, the manufacturing of Fresnel lens components for a generally circular solar collector is problematic.

An object of the present invention is to provide an apparatus and a method for manufacturing Fresnel lens components for a generally circular solar collector that will provide for the matching of Fresnel lens facet grooves of the components with the desired overall pattern of the solar collector and will provide for economy in manufacturing, including the use of common size rollers and other common extrusion equipment and the minimization of material waste. For purposes of this application, the term "generally circular" shall be defined to include polygon shapes such as an octagonal or hexagonal shape which have sides which are roughly equidistant from the geometric center of the collector.

SUMMARY OF THE INVENTION

A preferred apparatus and method of the present invention utilizes a two roller extruder that is equipped with a blank roller and a die roller. The die roller is equipped with one or more peripheral lens dies. The lens dies provide, as the blank roller and the die roller rotate through one complete revolution, for the extrusion of a pair of lens subsegments, comprising a first or inner lens subsegment and a second or outer lens subsegment.

The die roller also has Fresnel facet dies for impressing Fresnel facet grooves in the first lens subsegment and the second lens subsegment in a pattern that provides for the Fresnel facet grooves to have a common center of curvature when the first lens subsegments and the second lens subsegments are positioned in a solar collector. The Fresnel facet dies also provide for an appropriate progression of the Fresnel grooving with distance from the common center of curvature so that solar energy incident to and passing the solar collector will be focused roughly to a common focal point or common focal field.

A power shaft or other means known to persons skilled in the art can be used to provide power to the blank roller shaft and the die roller shaft, with the blank roller and the die roller having a power link and preferably being driven at the same speed from the same power source.

A raw plastic sheet is fed to the rollers and successive pairs of the first lens subsegment and the second lens subsegment are discharged. The raw plastic sheet can be supplied from a roll of blank plastic sheeting or can be supplied from a raw sheet extruder using raw plastic pellets, ingots or the like. Depending upon the plastic being used, the desired thickness of the angular lens segments and other factors, the temperature of the raw plastic sheet will likely need to be controlled. The inventor of the present invention prefers to deploy the method of the present invention downstream of a raw sheet extruder which will normally discharge the raw sheet plastic in a pliable condition at an elevated temperature.

A continuous stream of successive pairs of angular lens segment components, namely a first lens subsegment and a second lens subsegment, each pair being fitted together to form an angular lens segment for a solar collector can be produced using the method of the present invention. The method of the present invention also provides for eliminating or minimizing the waste of raw plastic material.

Generally longitudinal lens dies on the die roller impress the left edge and the right edge of each successive first lens subsegment and the left edge and the right edge of each successive second lens subsegment, the first right edge of each first lens subsegment being impressed proximal to the second right edge of an adjacent second lens subsegment, and the first left edge of each first lens subsegment being impressed proximal to the second left edge of an adjacent second lens subsegment. Optional end lens dies at the opposing die roller ends may also be used to impress the inner edges and the outer edges of each successive first lens subsegment and each successive second lens subsegment. Fresnel facet dies on the die roller impress Fresnel facet grooves on each successive first lens subsegment and each successive second lens subsegment. The Fresnel facet die pattern impresses a Fresnel facet groove pattern with facet grooves for each angular lens segment having a common center of curvature and progressive refraction, thus providing for focus of incident solar radiation on a common focal point or common focal zone.

Depending upon the diameter of the die roller and the desired dimensions of the angular lens segments, the orientation of the lens die may be changed to be oriented generally circumferential rather than generally longitudinal on the die roller, re-orienting the general layout of the first lens subsegment and the second lens subsegment on the die roller by ninety degrees. For that embodiment, the first inner edge and the second outer edge is impressed by a longitudinal lens dye and is proximal to the first outer edge and the second inner edge.

DETAILED DESCRIPTION

Figure 1:
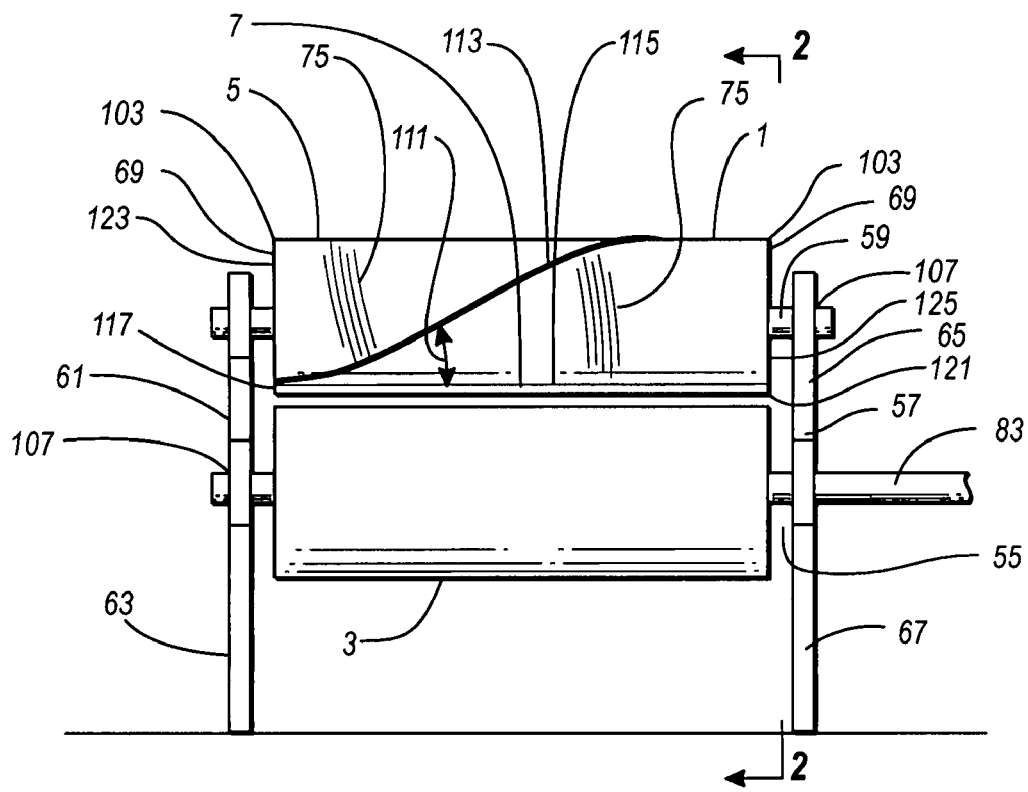
FIG. 1 is a front elevation view of a preferred embodiment of a roller extruder of the present invention utilized for a preferred embodiment of the method of the present invention to manufacture Fresnel lens angular segments.
Figure 2:
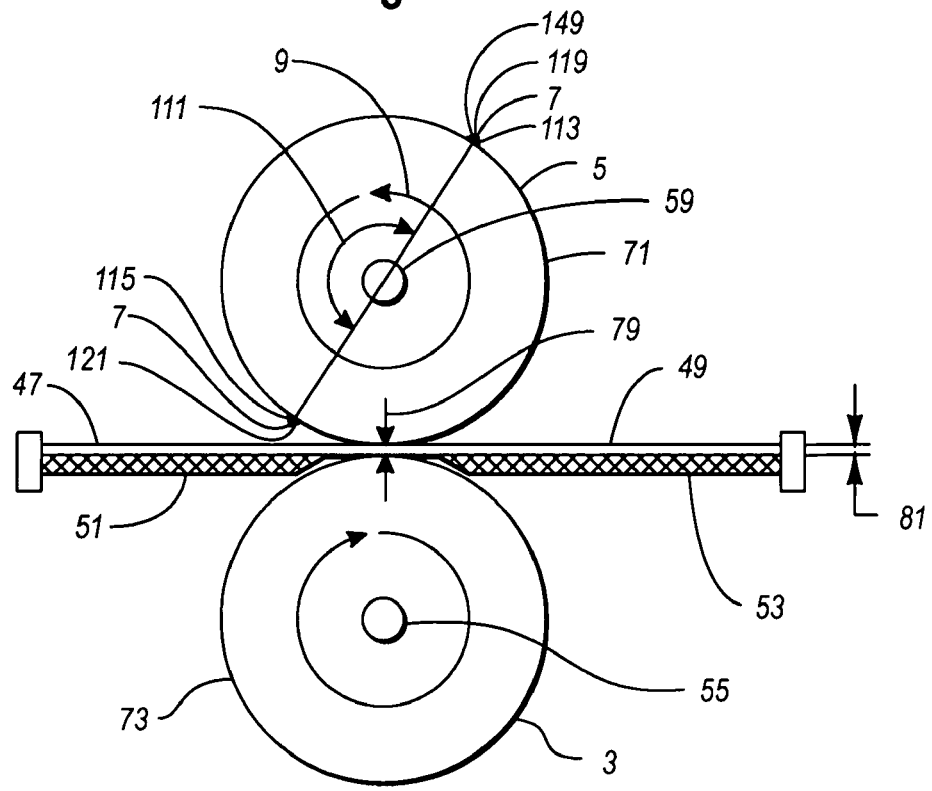
FIG. 2 is a vertical side view cross-section of the roller extruder of FIG. 1 utilized to manufacture Fresnel lens angular segments.
Figure 3:
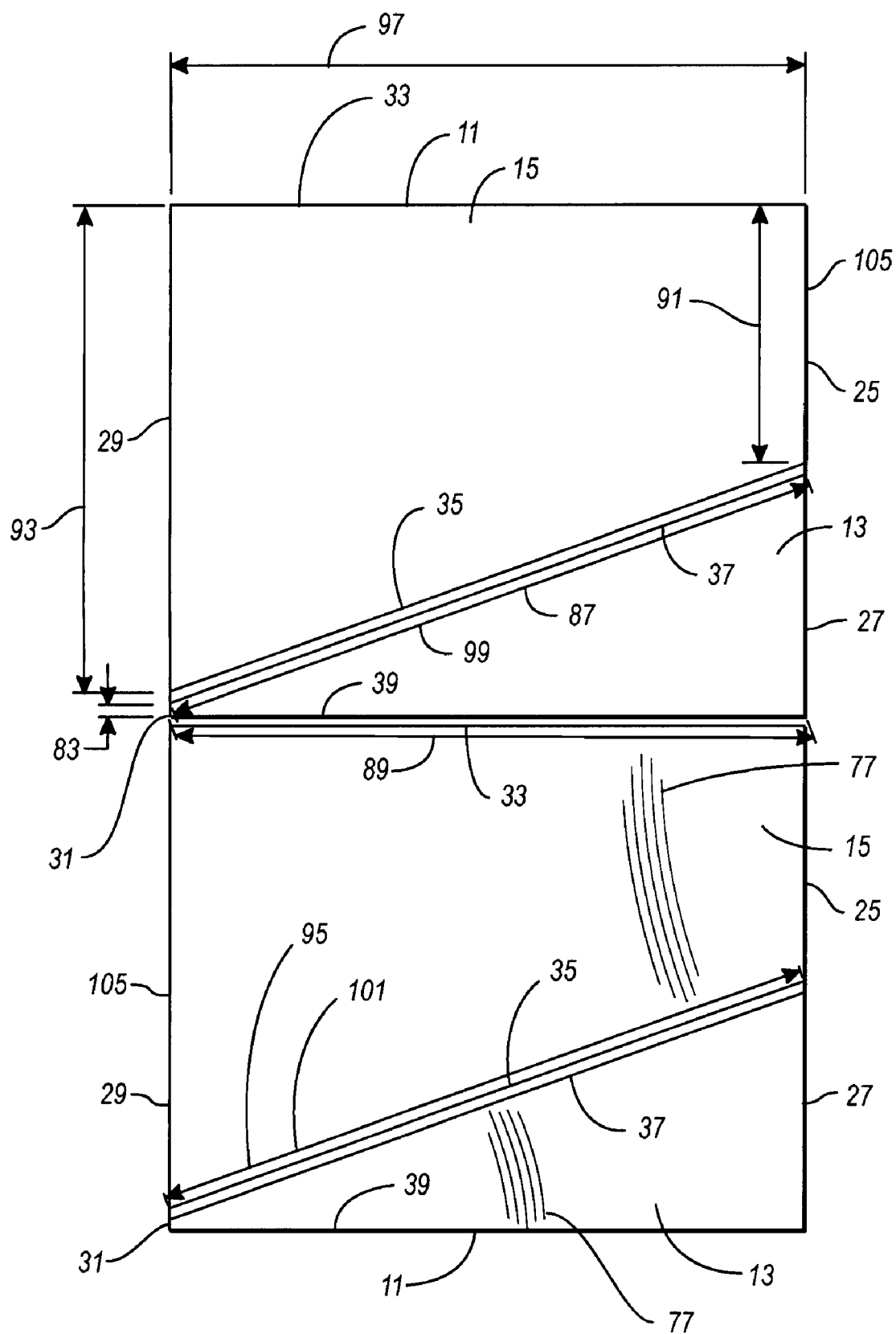
FIG. 3 is a plan view detail of two successive pairs of Fresnel lens subsegments manufactured through use of a preferred embodiment of the roller extruder of FIG. 1 and a preferred embodiment of the method of the present intention.
Figure 4:
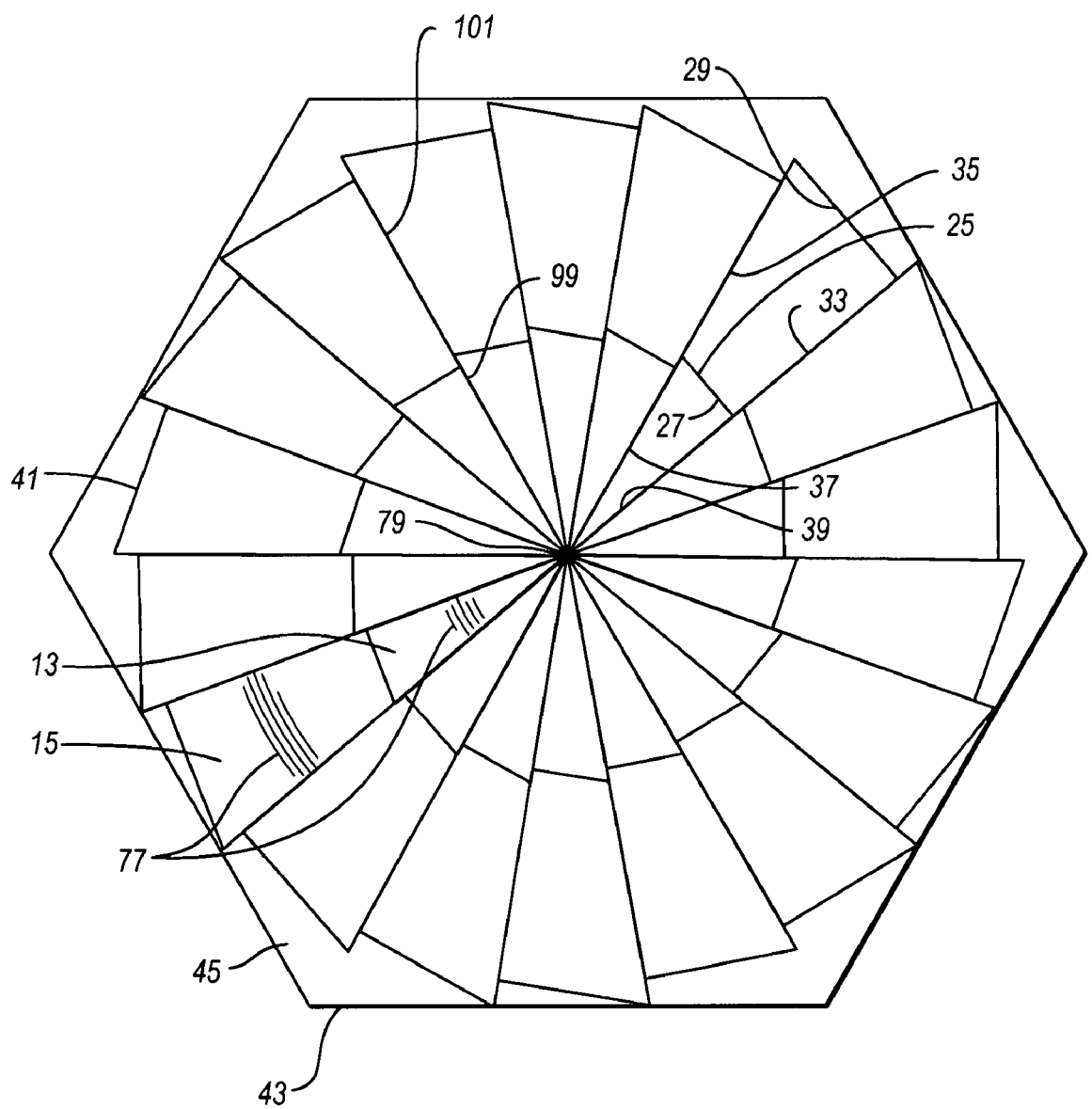
FIG. 4 is a plan view of a hexagon shaped solar collector utilizing Fresnel lens angular segments comprised of Fresnel lens subsegments manufactured through use of the preferred embodiment of the roller extruder of FIG. 1 and a preferred embodiment of the method of the present invention.

Referring first to FIG. 1, a preferred embodiment of the roller extruder 1 of the present invention having a blank roller 3 and a die roller 5 is shown. The die roller, for the preferred embodiment shown is equipped with two peripheral lens dies 7. Referring also to FIG. 2 and FIG. 3, the lens dies provide, as the blank roller and the die roller rotate through one complete revolution 9, for the extrusion of a lens wafer 105 having a pair of lens subsegments 11, comprising a first or inner lens subsegment 13 and a second or outer lens subsegment 15. The die roller also has Fresnel facet dies 75 for impressing, as the die roller is rotated through a complete rotation, Fresnel facet grooves 77 in the first lens subsegment and the second lens subsegment in a pattern that provide for the Fresnel facet grooves to have a common center of curvature 79 when the first lens subsegments and the second lens subsegments are positioned in a solar collector 45 as shown in FIG. 4. The Fresnel facet dies also provide for an appropriate progression of the Fresnel grooving with distance from the common center of curvature so that solar energy incident to and passing the solar collector will be focused roughly to a common focal point or common focal field.

Referring again to FIG. 1, the first lens die 113 and the second lens die 115 are angularly separated by a primary angular displacement 111 between the first lens die and the second lens die which increases linearly from the die junction 117, which is proximal to the first roller inner edge 123, to the first die end 119 and the second die end 121, which are proximal to the first roller outer edge 125. The first lens die and the second lens die may be joined or proximally joined at the die junction. The angular displacement between the first lens die at the first die end and the second lens die at the second die end for the preferred embodiment shown is approximately one hundred eighty degrees (180°). This is true whether the first lens die is generally horizontal as shown for the embodiment illustrated in FIG. 1 and FIG. 2 or the first lens die and the second lens die are both angularly displaced as shown for the alternative embodiment illustrated in FIG. 5 and FIG. 6.

Referring again to FIG. 1 and FIG. 2, a power shaft 83 can be used to provide power to the blank roller shaft 55 and the die roller shaft 59, with the blank roller and the die roller having a power link 57 and preferably being driven at the same speed from the same power source. Sprockets on the roller shaft and die roller shaft with chains or belts positively linking the rollers provides for the roller speed of the blank roller and the die roller to be equal. Other roller drive mechanisms for driving the rollers will be known to persons skilled in the art.

A pair of lower roller supports 63, 67 and a pair of upper roller supports 61, 65 maintain a desired roller clearance 79 between the blank roller periphery 73 and the die roller periphery 71, which determines the Fresnel lens thickness 81 of the finished lens output 49 which will be comprised of successive pairs of lens subsegments, a first lens subsegment 13 and a second lens subsegment 15. Shaft bearings 107 provide for the free rotation of the rollers on the support structure. The raw plastic sheet 47 is fed to the rollers upon a feed platform 51 and successive pairs of the first lens subsegment and the second lens subsegment as impressed in the lens wafer are discharged upon a discharge platform 53. Other roller support structures for supporting the rollers and maintaining the desired roller clearance between the blank roller periphery and the die roller periphery will be known to persons skilled in the art.

The raw plastic sheet can be supplied from a roll of blank plastic sheeting or can be supplied from a raw sheet extruder using raw plastic pellets, ingots or the like. Depending upon the plastic being used, the desired thickness of the angular lens segments and other factors, the temperature of the raw plastic sheet will likely need to be controlled. The inventor of the present invention prefers to deploy the method of the present invention downstream of a raw sheet extruder which will normally discharge the raw sheet plastic in a pliable condition at an elevated temperature. As noted above, the temperature of the raw sheet plastic that is optimum for the method of the present invention will depend on the plastic being used, the thickness of the plastic and other factors that will be unique to each installation.

Referring again to FIG. 3, two successive pairs of angular lens segment components, namely a first lens subsegment 13 and a second lens subsegment 15, each pair being fitted together to form an angular lens segment 41 for a solar collector 45 as shown in FIG. 4 illustrate the continuous stream of angular lens segments that can be produced using the method of the present invention. The first lens subsegment has a first inner edge 31 with a first inner generally circumferential dimension 83, a first outer edge 27 with a first outer generally circumferential dimension 85, a first left edge 37 with a first left dimension 87 and a first right edge 39 with a first right dimension 89. The second lens subsegment has a second inner edge 25 with a second inner generally circumferential dimension 91, a second outer edge 29 with a second outer generally circumferential dimension 93, a second left edge 35 with a second left dimension 95, and a second right edge 33 with a second right dimension 97, the first outer generally circumferential dimension being roughly equal to the second inner generally circumferential dimension providing for the second lens subsegment to fit against the first lens subsegment with the second inner edge fitting against the first outer edge for assembling an angular lens segment for a solar collector 45 as shown in FIG. 4, the first lens subsegment having a first radial dimension 99 from the first inner edge to the first outer edge, the second lens subsegment having a second radial dimension 101 from the second inner edge to the second outer edge.

For the embodiment shown, the generally longitudinal lens dies 7 on the die roller impress the left edge and the right edge of each successive first lens subsegment and the left edge and the right edge of each successive second lens subsegment, the first right edge of each first lens subsegment being impressed proximal to the second right edge of an adjacent second lens subsegment, and the first left edge of each first lens subsegment being impressed proximal to the second left edge of an adjacent second lens subsegment. Fresnel facet dies 75 on the die roller impress Fresnel facet grooves 77 on each successive first lens subsegment and each successive second lens subsegment, the Fresnel facet die pattern impresses a Fresnel facet groove pattern with facet grooves for each angular lens segment having a common center of curvature and progressive refraction, thus providing for focus of incident solar radiation on a common focal point or common focal zone.

Optional end lens dies 69 at the opposing die roller ends 103 may be used to impress the inner edges and the outer edges of each successive first lens subsegment and each successive second lens subsegment. However, the inventor prefers not to utilize end lens dies on the die roller. This allows the inner edges and outer edges of the lens wafer to extend beyond the desired finish inner edges and outer edges of the lens subsegments, thereby accommodating variations in the thickness of the raw plastic sheet, and allowing the lens subsegments to be trimmed, after extrusion, at the desired inner edges and desired outer edges. This reduces the probability of lens subsegments not fully extending to the desired finish inner edge and the desired finish outer edge, which requires the rejection of the lens subsegments.

Depending upon the diameter of the die roller and the desired dimensions of the angular lens segments, the orientation of the lens die which impresses the first left edge 37 and the second left edge 35 may be changed to be oriented generally circumferential rather than generally longitudinal on the die roller, re-orienting the general layout of the first lens subsegment and the second lens subsegment on the die roller by ninety degrees. For that embodiment, the first inner edge 31 and the second outer edge 29 would be impressed by a longitudinal lens dye 7 and would be proximal to the first outer edge 27 and the second inner edge 25.

Figure 5:
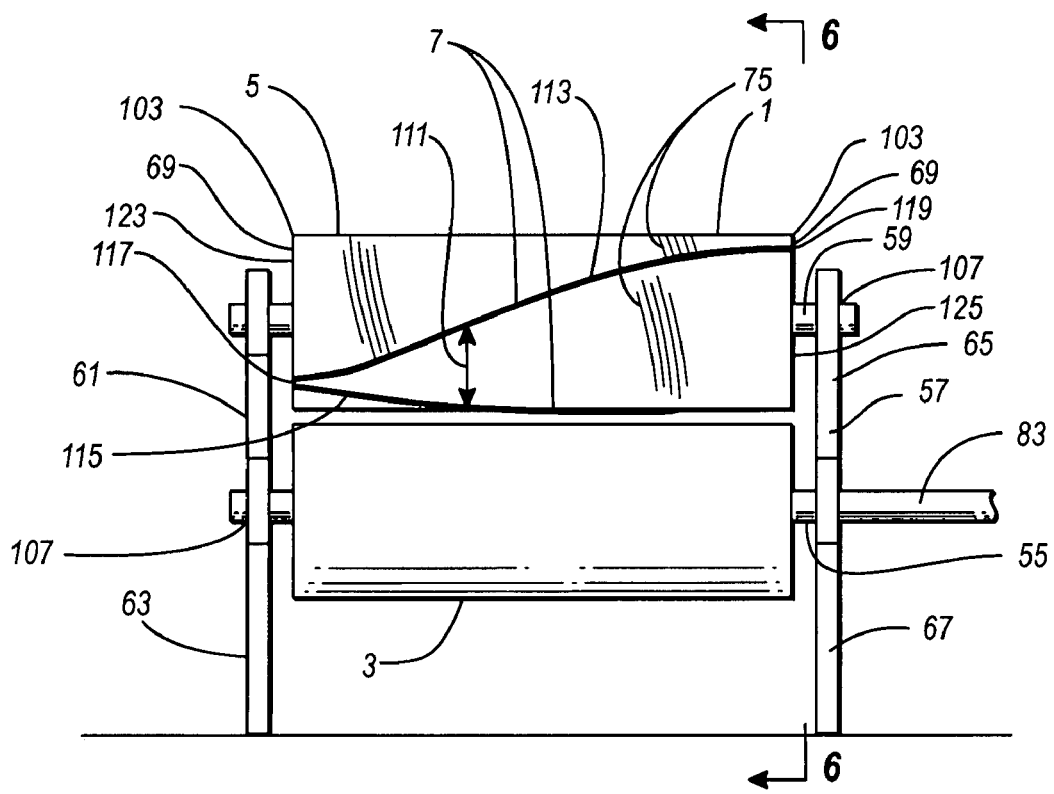
FIG. 5 is a front elevation view of an alternative preferred embodiment of a roller extruder of the present invention utilized for a alternative preferred embodiment of the method of the present invention to manufacture Fresnel lens angular segments.
Figure 7:
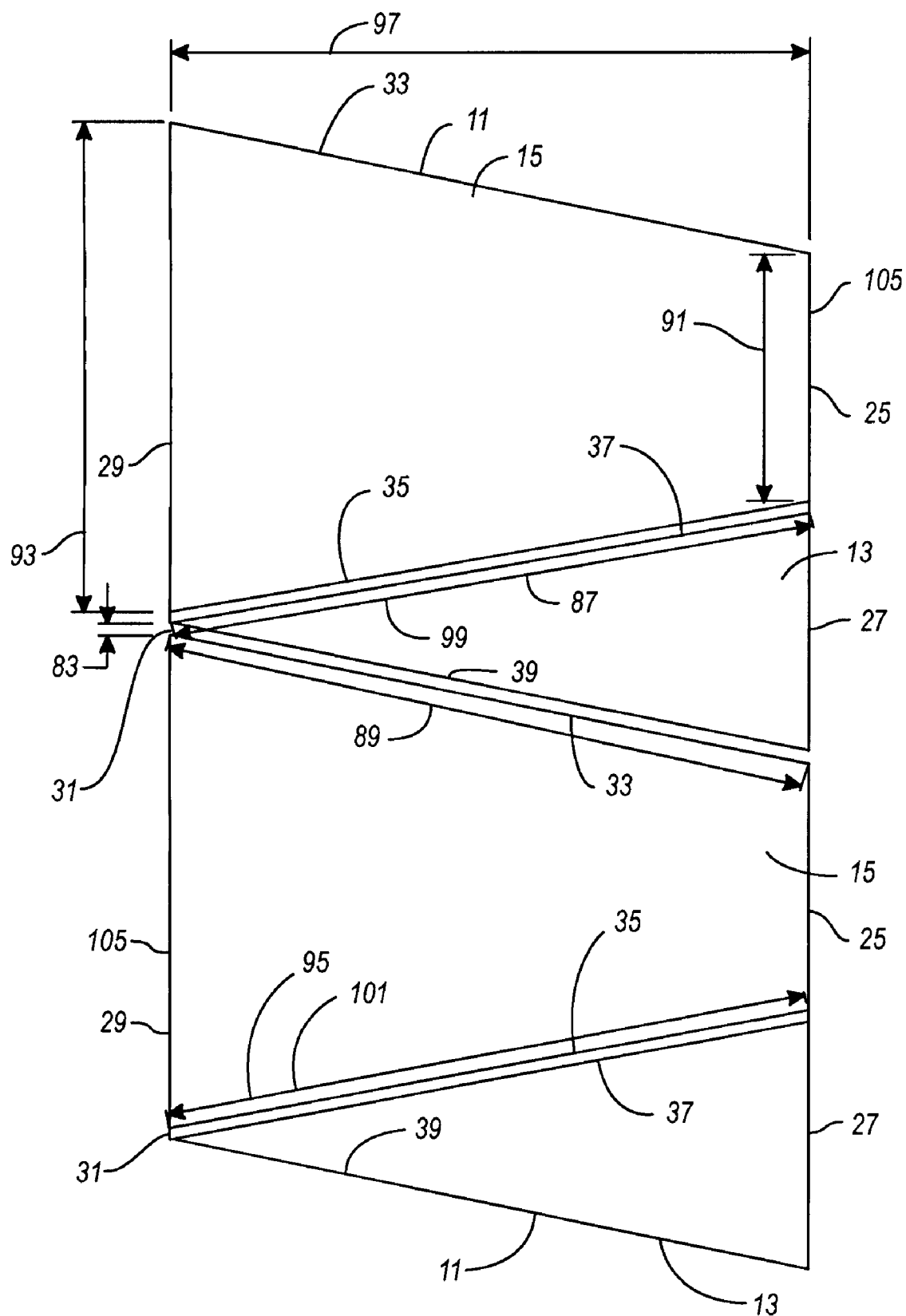
FIG. 7 is a plan view detail of two successive pairs of Fresnel lens subsegments manufactured through use of an alternative preferred embodiment of the roller extruder of FIG. 5 and an alternative preferred embodiment of the method of the present intention.
Figure 8:
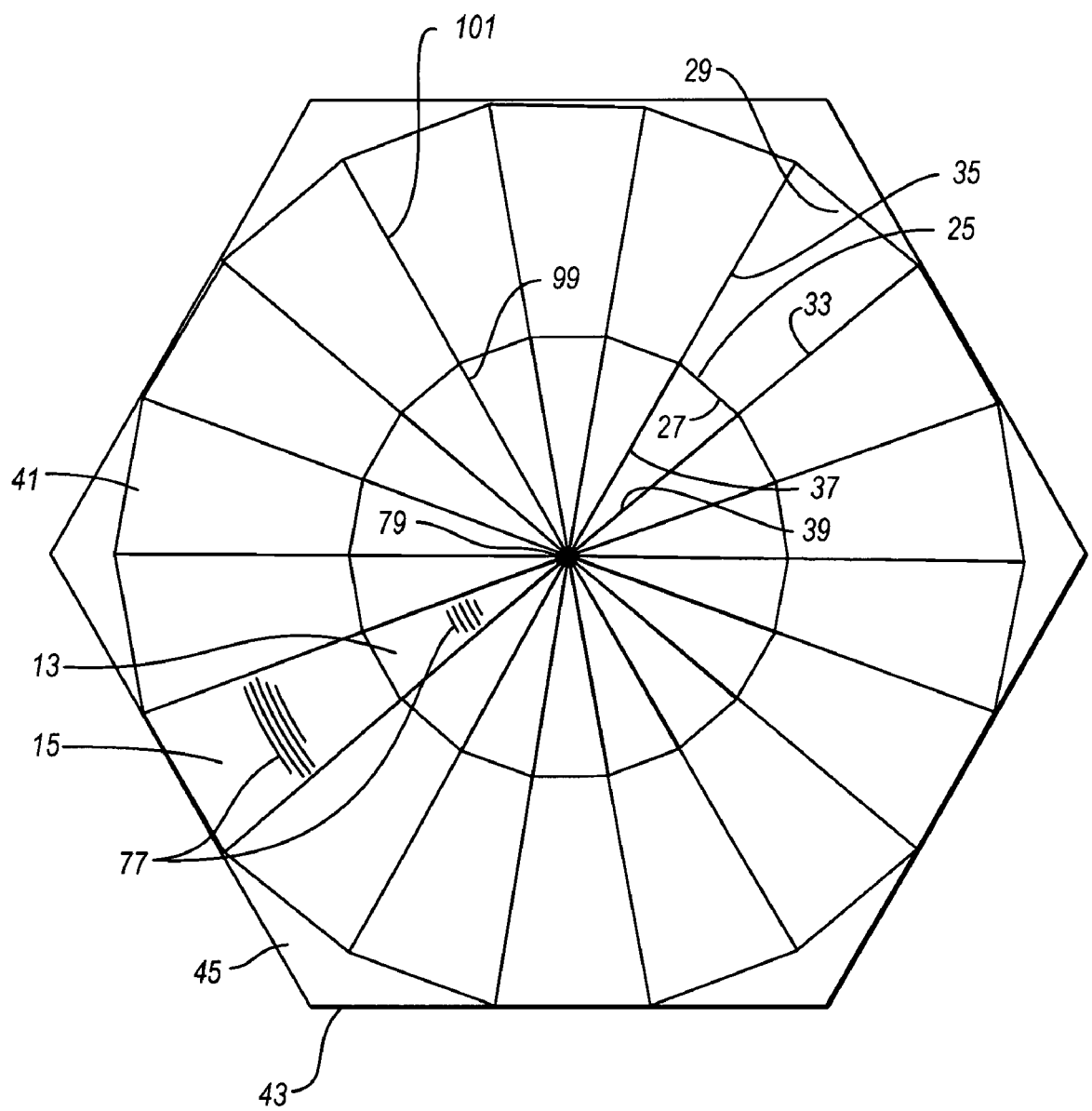
FIG. 8 is a plan view of a hexagon shaped solar collector utilizing Fresnel lens angular segments comprised of Fresnel lens subsegments manufactured through use of the alternative preferred embodiment of the roller extruder of FIG. 5 and an alternative preferred embodiment of the method of the present invention.

Referring now to FIG. 7, two successive pairs of Fresnel lens subsegments manufactured through use of the alternative preferred embodiment of the roller extruder shown in FIG. 5 are shown. FIG. 8 illustrates a plan view of a hexagonal shaped solar collector utilizing Fresnel lens angular segments comprised of the Fresnel lens subsegments of FIG. 7 manufactured through use of the alternative preferred embodiment of the roller extruder of FIG. 5.

Figure 9:
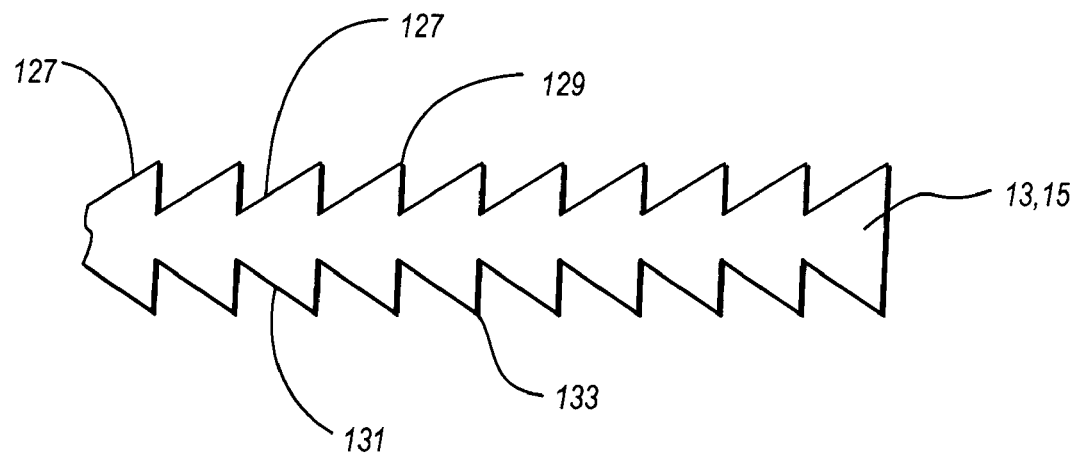
FIG. 9 is a cross-section detail of an alternative embodiment of a Fresnel lens subsegment manufactured with matching Fresnel facet grooves on both the front subsegment surface and the rear subsegment surface.
Figure 18:
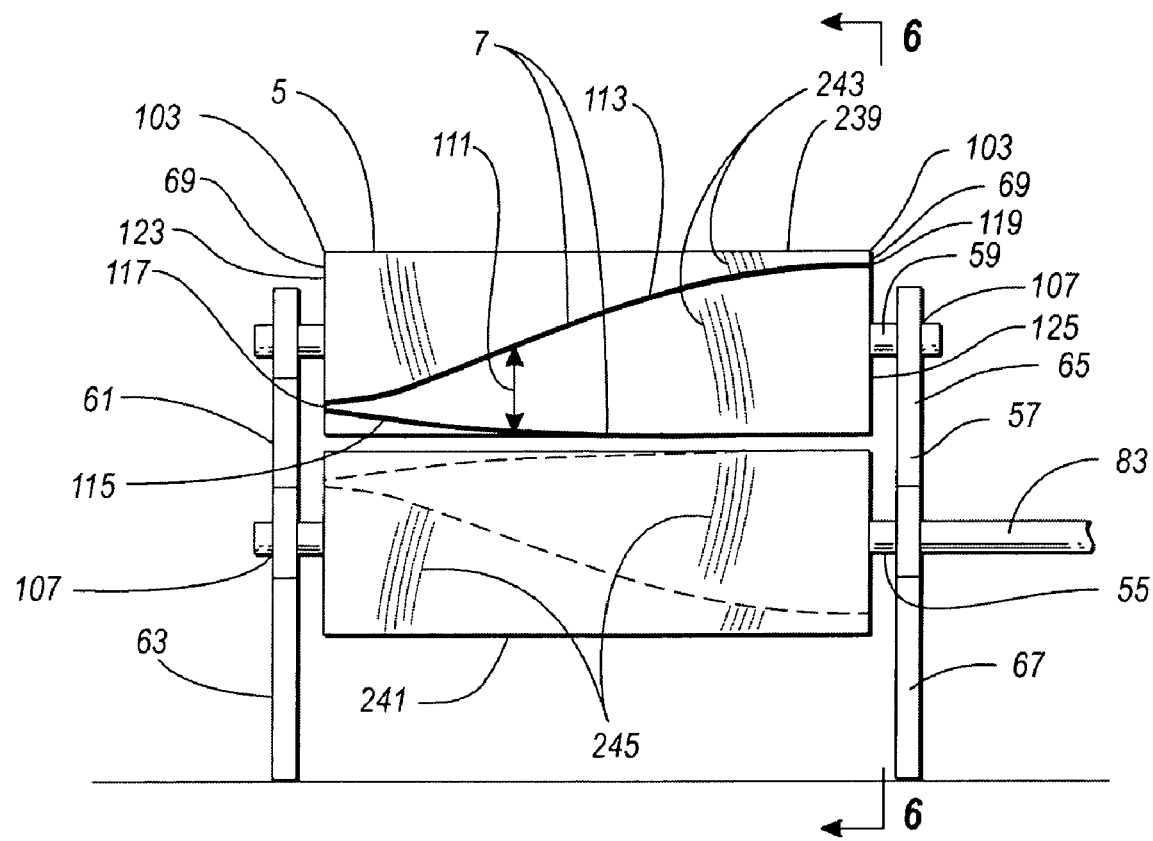
FIG. 18 is a front elevation view of an alternative preferred embodiment of a roller extruder of the present invention having a first die roller and a second die roller for impressing Fresnel facet grooves on both surfaces of the angular lens subsegments.

A further alternative embodiment of the two roller extruder of the present invention, that is used for an alternative embodiment of the method of the present invention, consists of a first die roller 239 and a second die roller 241 as shown in FIG. 18, the first die roller being substantially similar to the die roller described above and shown in FIGS. 1-2 and FIGS. 5-6, having at least two generally longitudinal peripheral lens dies and peripheral first Fresnel facet dies 243. However, for this alternative embodiment, the second die roller 241 also has peripheral second Fresnel facet dies 245. The second peripheral Fresnel facet dies of the second die roller may match the first Fresnel facet dies, with the pattern of the matching second Fresnel facet dies being a mirror image of the pattern of the first Fresnel facet dies, with the patterns of the Fresnel facet dies and the synchronization of the first die roller and the second die roller providing for matching of first Fresnel facet grooves 127 on the front subsegment surface 129 and second Fresnel facet grooves 131 on the rear subsegment surface 133 of each lens subsegment 13,15 as shown in FIG. 9. Similarly the cross-sections and other dimensions of the first Fresnel facet dies and the second Fresnel facet dies may be generally the same, providing for the cross-section 135 of first Fresnel facet grooves and the cross-section 137 of the second Fresnel facet grooves to be the same, as shown in FIG. 9. The effect of impressing matching Fresnel facet grooves on both surfaces of the lens subsegments is that the focal length of the lens is approximately one-half of the focal length of a comparable lens with Fresnel facet grooves impressed on one surface only.

Figure 10:
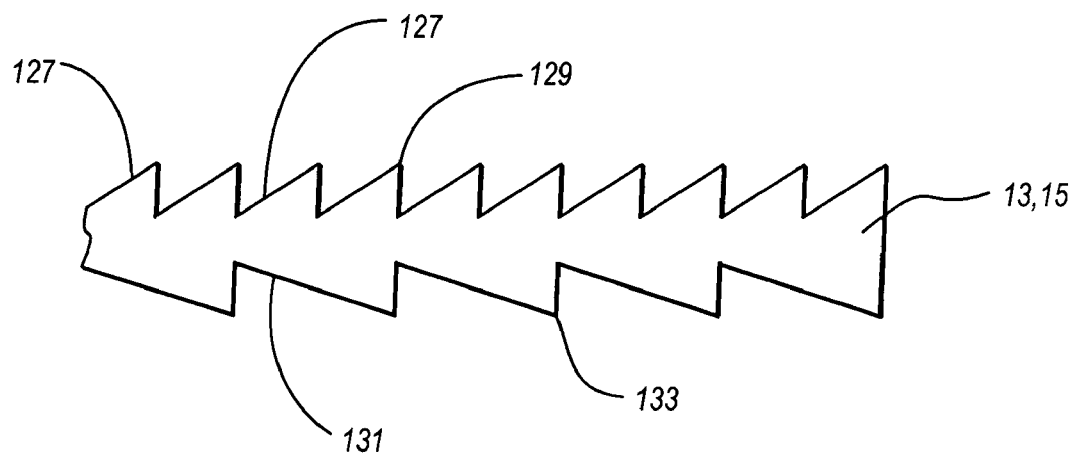
FIG. 10 is a cross-section detail of an alternative embodiment of a Fresnel lens subsegment manufactured with non-matching Fresnel facet grooves on the front subsegment surface and the rear subsegment surface.

However, the spacing and dimensions of the second Fresnel facet dies do not necessarily have to be the same as the first Fresnel facet dies. It is merely essential that the second Fresnel facet dies impress Fresnel facet grooves on the rear subsegment surface of each successive first lens subsegment and each successive second lens subsegment, which will provide a grove pattern for each angular lens segment having a common center of curvature, which center of curvature is directly opposite the center of curvature on the opposing front surface of the angular lens segment, and will provide for progressive refraction, thus providing for focus of incident solar radiation on a common focal point or common focal zone. First Fresnel facet grooves 127 and second Fresnel facet grooves 131 having a differing cross-section are illustrated in FIG. 10.

Figure 6:
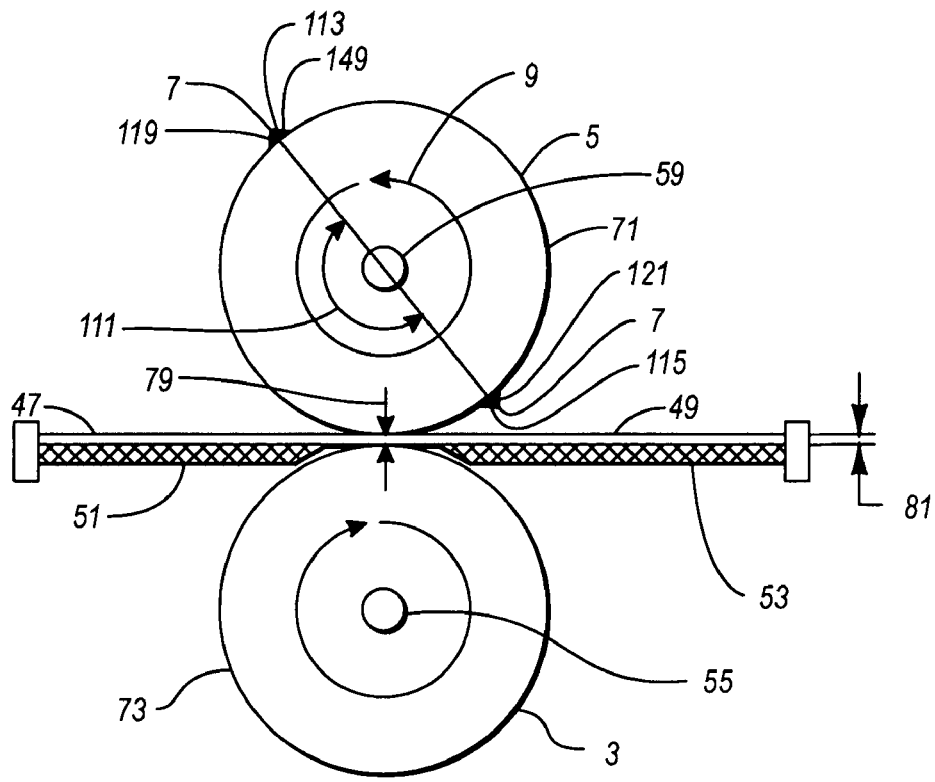
FIG. 6 is a vertical side view cross-section of the alternative roller extruder of FIG. 5 utilized to manufacture Fresnel lens angular segments.

The embodiment of the die roller 5 shown in FIG. 1-2 and the embodiment shown in FIG. 5-6 are all illustrated with a first lens die 113 and a second lens die 115 that have a triangular cross section and have a die protrusion 149 which protrudes from the die roller. However, the first lens die and the second lens die may have a number of other cross-sections, some of the other preferred cross-sections being illustrated in FIGS. 11-13.

Figure 11:
FIG. 11 is a cross-section detail of an alternative embodiment of a lens die which is a lens groove.
Figure 12:
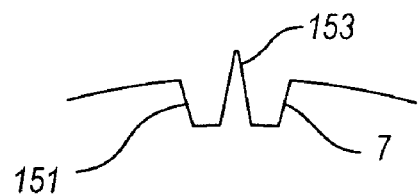
FIG. 12 is a cross-section detail of an alternative embodiment of a lens die which is a lens groove with an embodiment of a lens groove protrusion.
Figure 13:
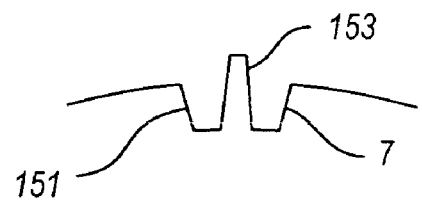
FIG. 13 is a cross-section detail of an alternative embodiment of a lens die which is a lens groove with an alternative embodiment of a lens groove protrusion.

FIG. 11 illustrates a lens die 7 that is a lens groove 151 with a trapezoidal cross-section. Groove embodiments of the lens die such as this provide for thickening of the edges of the lens subsegments. The trapezoidal cross-section facilitates the separation of the lens subsegments from the die roller. Referring to FIGS. 12-13, other alternative cross-sections of a lens die 7 incorporating lens grooves 151 are shown. The lens groove of FIG. 11 requires the subsequent division of the first lens subsegment from the second lens subsegment by cutting or otherwise dividing the first left edge 37 from the second right edge 33 and the first right edge 39 from the second left edge 35. The lens dies of FIG. 12 and FIG. 13 on the other hand incorporate lens grooves 151 and a lens groove protrusion 153 which provide for the division of the first lens subsegment from the second lens subsegment, while providing for thickened edges of the lens subsegments. Other embodiments of the lens dies, whether or not incorporating die protrusions, lens grooves, lens groove protrusions, or other cross-sections, in view of the foregoing will be known to persons skilled in the art.

For embodiments incorporating end lens dies 69, the lens die cross-sections illustrated in FIGS. 2 and 5, and in FIGS. 11-13, as well as other embodiments known to persons skilled in the art in view of the foregoing, may be used for the end lens dies as well.

Also, embodiments for the configuration of the peripheral lens dies varying between the configuration shown in FIG. 1 and the configuration shown in FIG. 5, in view of the foregoing, will be known to persons skilled in the art.

Figure 14:
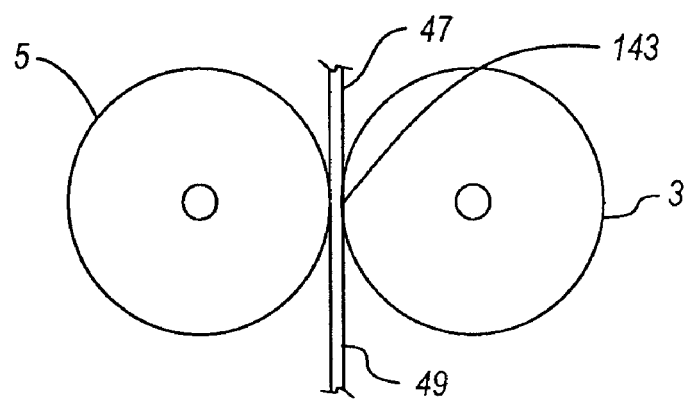
FIG. 14 is a vertical side view cross-section of an alternative roller extruder with vertical feed of raw plastic and vertical takeoff finished lens output.
Figure 15:
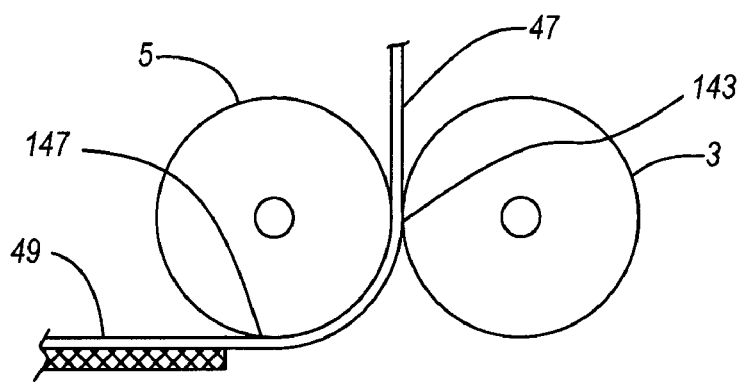
FIG. 15 is a vertical side view cross-section of an alternative roller extruder with vertical feed of raw plastic and horizontal takeoff finished lens output.

Referring again to FIGS. 2 and 6, horizontal feed of the raw plastic 47 is shown for the embodiments of FIGS. 2 and 6. However, referring to FIG. 14, vertical feed of the raw plastic 47 may be used for other embodiments. Similarly, while horizontal takeoff of the finished lens output 49 may be used as shown for the embodiments of FIGS. 2 and 6, if the raw plastic is fed vertically to the extruder, vertical takeoff of the finished lens output from the pinch point 143 may be used as shown in FIG. 14, or horizontal takeoff of the finished lens output from the die roller bottom 147 of the die roller 5, as shown in FIG. 15, or from the bottom of the blank roller.

Figure 16:
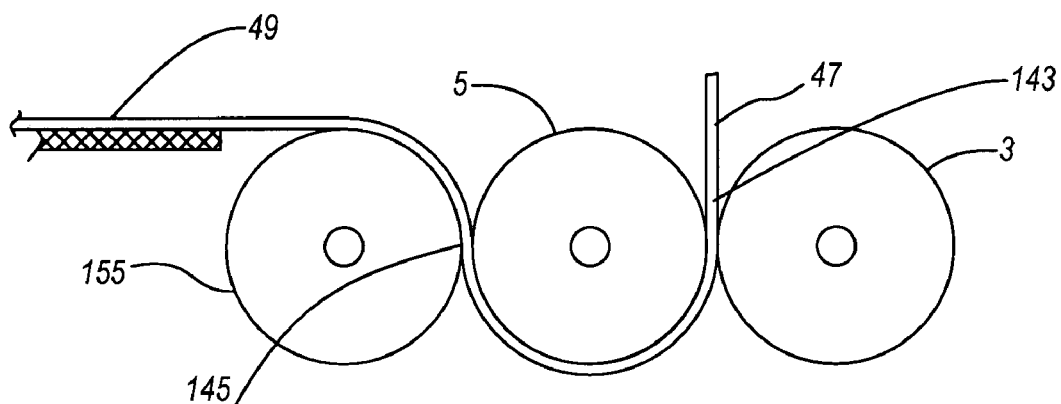
FIG. 16 is a vertical side view cross-section of an alternative roller extruder having three rollers with vertical feed of raw plastic and horizontal takeoff finished lens output.

Referring to FIG. 16, alternative embodiments of the roller extruder 1 of the present invention may incorporate three rollers, a die roller 5, a blank roller 3, and a third roller 155. For the embodiment shown, the die roller and the blank roller are as shown in FIG. 1 or FIG. 5. The third roller may be a blank roller or may be a die roller having second Fresnel facet dies, thereby providing for impressing second Fresnel facet grooves 131 on the rear subsegment surface 133 of each lens subsegment as shown in FIG. 9 and FIG. 10. If the third roller is to be used to impress second Fresnel facet grooves, it will ordinarily be necessary to provide heat to the third roller, as the lens subsegments are ordinarily allowed to cool on the first roller as the lens subsegments progress from the first pinch point 143 between the first roller and the second roller to the second pinch point 145 between the first roller and the third roller.

Figure 17:
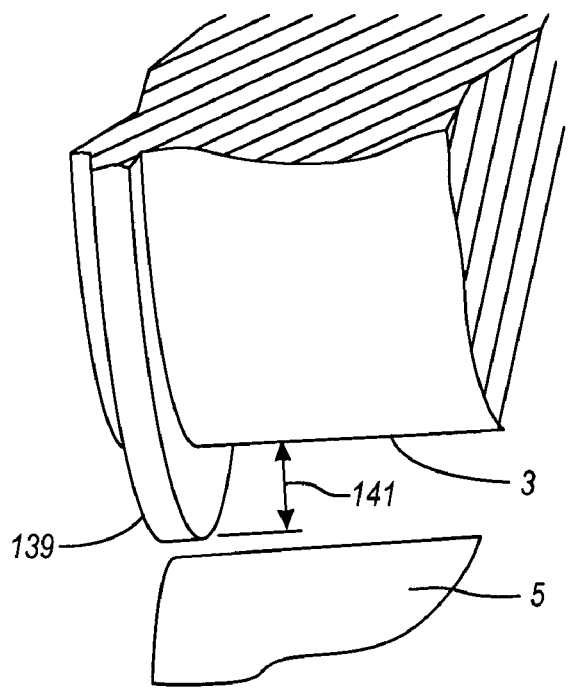
FIG. 17 is a front view perspective detail of an optional safety ring for a roller of a roller extruder of the present invention.

Referring to FIG. 17, the blank roller 3 or the die roller 5, for a two roller alternative, or the blank roller, the die roller, or the third roller for a three roller alternative, may have a safety ring 139, preferably affixed to the roller near the inner edge or the outer edge of the roller. Alternative embodiments may incorporate a pair of safety rings, one safety ring preferably being affixed near the inner edge and the other near the outer edge of one of the rollers. The safety ring maintains a minimum roller clearance 141 between the rollers, thereby preventing damage from roller contact in the course of normal use.

Other embodiments and other variations and modifications of the embodiments described above will be obvious to a person skilled in the art. Therefore, the foregoing is intended to be merely illustrative of the invention and the invention is limited only by the following claims and the doctrine of equivalents.

What is claimed is:

1. Roller extruder for manufacturing Fresnel lens angular lens segments comprising a pair of lens subsegments, a first or inner lens subsegment and a second or outer lens subsegment, the first or inner lens subsegment having a first outer edge and the second or outer lens subsegment having a second inner edge, the roller extruder comprising:
   a) blank roller;
   b) die roller having a first roller inner edge and a first roller outer edge, the die roller having two peripheral lens dies, the two peripheral lens dies comprising a first lens die and a second lens die, the first lens die and the second lens die being proximally joined proximal to the first roller inner edge and which have a primary angular displacement of approximately one hundred eighty degrees proximal to the first roller outer edge, and the die roller having peripheral Fresnel facet dies, the peripheral lens dies providing, as the blank roller and the die roller rotate through one complete revolution, for the extrusion of the first or inner lens subsegment and the second or outer lens subsegment, and the Fresnel facet dies providing, as the blank roller and the die roller rotate through one complete revolution, for the impression of curved Fresnel facet grooves in the first or inner lens subsegment and the second or outer lens subsegment such that when the first or inner lens subsegment first outer edge is fitted to the second or outer lens subsegment second inner edge the Fresnel facet grooves of the first or inner lens subsegment and the second or outer lens subsegment have a common center of curvature;
   c) roller support structure; and
   d) roller drive mechanism.

2. Roller extruder as recited in claim 1 wherein the die roller has an axis of rotation and the first lens die is parallel to the axis of rotation.

3. Roller extruder as recited in claim 1 wherein the die roller has an axis of rotation and the second lens die is parallel to the axis of rotation.

4. Roller extruder as recited in claim 1 further comprising a first end lens die extending circumferentially around the die roller proximal to the first roller inner edge and a second end lens die extending circumferentially around the die roller proximal to the first roller outer edge.

5. Roller extruder as recited in claim 1 further comprising a safety ring affixed circumferentially to the die roller or the blank roller.

6. Roller extruder as recited in claim 1 further comprising a third roller.

7. Roller extruder for manufacturing Fresnel lens angular lens segments comprising a pair of lens subsegments, a first or inner lens subsegment and a second or outer lens subsegment, the first or inner lens subsegment having a first outer edge and the second or outer lens subsegment having a second inner edge, the roller extruder comprising:
   a) blank roller;
   b) die roller having a first roller inner edge and a first roller outer edge, the die roller having two peripheral lens dies, the two peripheral lens dies comprising a first lens die having a first die end and a second lens die having a second die end, and the die roller having peripheral Fresnel facet dies, the first lens die and the second lens die being proximally joined at a die junction which is proximal to the first roller inner edge, and the first lens die and the second lens die being angularly separated by a primary angular displacement which increases approximately linearly with longitudinal distance from the die junction to the first die end and the second die end, the first die end and the second die end being proximal to the first roller outer edge, and the primary angular displacement between the first die end and the second die end being approximately one hundred eighty degrees, the peripheral lens dies providing, as the blank roller and the die roller rotate through one complete revolution, for the extrusion of the first or inner lens subsegment and the second or outer lens subsegment, and the Fresnel facet dies providing, as the blank roller and the die roller rotate through one complete revolution, for the impression of curved Fresnel facet grooves in the first or inner lens subsegment and the second or outer lens subsegment such that when the first or inner lens subsegment first outer edge is fitted to the second or outer lens subsegment second inner edge the Fresnel facet grooves of both surfaces of the first or inner lens subsegment and the second or outer lens subsegment have a common center of curvature;
   c) roller support structure; and
   d) roller drive mechanism.

8. Roller extruder as recited in claim 7 wherein the die roller has an axis of rotation and the first lens die is parallel to the axis of rotation.

9. Roller extruder as recited in claim 7 wherein the die roller has an axis of rotation and the second lens die is parallel to the axis of rotation.

10. Roller extruder as recited in claim 7 further comprising a first end lens die extending circumferentially around the die roller proximal to the first roller inner edge and a second end lens die extending circumferentially around the die roller proximal to the first roller outer edge.

11. Roller extruder as recited in claim 7 further comprising a safety ring affixed circumferentially to the die roller or the blank roller.

12. Roller extruder as recited in claim 7 further comprising a third roller.

13. Roller extruder for manufacturing Fresnel lens angular lens segments comprising a pair of lens subsegments, a first or inner lens subsegment and a second or outer lens subsegment, the first or inner lens subsegment having a first outer edge and the second or outer lens subsegment having a second inner edge, each lens subsegment having a front subsegment surface and a rear subsegment surface, the roller extruder comprising:
   a) second die roller having peripheral second Fresnel facet dies;
   b) first die roller having a first roller inner edge and a first roller outer edge, having two peripheral lens dies which are proximally joined proximal to the first roller inner edge and have a primary angular displacement of approximately one hundred eighty degrees proximal to the first roller outer edge, and the first die roller having peripheral first Fresnel facet dies, the peripheral lens dies providing, as the first die roller and the second die roller rotate through one complete revolution, for the extrusion of the first or inner lens subsegment and the second or outer lens subsegment, and the first Fresnel facet dies and the second Fresnel facet dies respectively providing, as the first die roller and the second die roller rotate through one complete revolution, for the impression of curved Fresnel facet grooves in the surfaces of the first or inner lens subsegment and the second or outer lens subsegment such that when the first or inner lens subsegment first outer edge is fitted to the second or outer lens subsegment second inner edge the Fresnel facet grooves of both surfaces of the first or inner lens subsegment and the second or outer lens subsegment have a common center of curvature;
   c) roller support structure; and
   d) roller drive mechanism.

14. Roller extruder as recited in claim 13 wherein the first die roller has an axis of rotation and the first lens die is parallel to the axis of rotation.

15. Roller extruder as recited in claim 13 wherein the first die roller has an axis of rotation and the second lens die is parallel to the axis of rotation.

16. Roller extruder as recited in claim 13 wherein the first Fresnel facet dies are matched by position and curvature with the second Fresnel facet dies and by synchronization of first die roller rotation with second die roller rotation provided by the roller drive mechanism, providing for the matching of the center of curvature of the first Fresnel facet grooves and the second Fresnel facet grooves such that when the first or inner lens subsegment first outer edge is fitted to the second or outer lens subsegment second inner edge the Fresnel facet grooves of both surfaces of the first or inner lens subsegment and the second or outer lens subsegment have a common center of curvature.

17. Roller extruder as recited in claim 13 further comprising a first end lens die extending circumferentially around the first die roller proximal to the first roller inner edge and a second end lens die extending circumferentially around the first die roller proximal to the first roller outer edge.

18. Roller extruder as recited in claim 13 further comprising a safety ring affixed circumferentially to the first die roller or the second die roller.

19. Roller extruder as recited in claim 13 further comprising a third roller.

20. Roller extruder for manufacturing Fresnel lens angular lens segments comprising a pair of lens subsegments, a first or inner lens subsegment and a second or outer lens subsegment, the first or inner lens subsegment having a first outer edge and the second or outer lens subsegment having a second inner edge, each lens subsegment having a front subsegment surface and a rear subsegment surface, the roller extruder comprising:
   a) second die roller having peripheral second Fresnel facet dies;

b) first die roller having a first roller inner edge and a first roller outer edge, having two peripheral lens dies, a first lens die having a first die end and a second lens die having a second die end, and the first die roller having peripheral first Fresnel facet dies, the first lens die and the second lens die being proximally joined at a die junction which is proximal to the first roller inner edge, and the first lens die and the second lens die being angularly separated by a primary angular displacement which increases approximately linearly with longitudinal distance from the die junction to the first die end and the second die end, the first die end and the second die end being proximal to the first roller outer edge, and the primary angular displacement between the first die end and the second die end being approximately one hundred eighty degrees, the peripheral lens dies providing, as the first die roller and the second die roller rotate through one complete revolution, for the extrusion of the first or inner lens subsegment and the second or outer lens subsegment, and the first Fresnel facet dies and the second Fresnel facet dies respectively providing, as the first die roller and the second die roller rotate through one complete revolution, for the impression of curved Fresnel facet grooves in the surfaces of the first or inner lens subsegment and the second or outer lens subsegment such that when the first or inner lens subsegment first outer edge is fitted to the second or outer lens subsegment second inner edge the Fresnel facet grooves of both surfaces of the first or inner lens subsegment and the second or outer lens subsegment have a common center of curvature;

c) roller support structure; and d) roller drive mechanism.

21. Roller extruder as recited in claim 20 wherein the first die roller has an axis of rotation and the first lens die is parallel to the axis of rotation.

22. Roller extruder as recited in claim 20 wherein the first die roller has an axis of rotation and the second lens die is parallel to the axis of rotation.

23. Roller extruder as recited in claim 20 wherein the first Fresnel facet dies are matched by position and curvature with the second Fresnel facet dies and by synchronization of first die roller rotation with second die roller rotation provided by the roller drive mechanism, providing for the matching of the center of curvature of the first Fresnel facet grooves and the second Fresnel facet grooves such that when the first or inner lens subsegment first outer edge is fitted to the second or outer lens subsegment second inner edge the Fresnel facet grooves of both surfaces of the first or inner lens subsegment and the second or outer lens subsegment have a common center of curvature.

24. Roller extruder as recited in claim 20 further comprising a first end lens die extending circumferentially around the first die roller proximal to the first roller inner edge and a second end lens die extending circumferentially around the first die roller proximal to the first roller outer edge.

25. Roller extruder as recited in claim 20 further comprising a safety ring affixed circumferentially to the first die roller or the second die roller.

26. Roller extruder as recited in claim 20 further comprising a third roller.

27. Roller extruder for manufacturing Fresnel lens angular lens segments comprising a pair of lens subsegments, a first or inner lens subsegment and a second or outer lens subsegment, the first or inner lens subsegment having a first outer edge and the second or outer lens subsegment having a second inner edge, the roller extruder comprising:

a) blank roller;

b) die roller having a first roller inner edge and a first roller outer edge, having one or more pairs of peripheral lens dies, each pair of peripheral lens dies comprising a first lens die and a second lens die, the first lens die and the second lens die being proximally joined proximal to the first roller inner edge, each pair being spaced equidistant around the periphery of the die roller, and each pair having a primary angular displacement approximately equal to three hundred sixty degrees divided by the total number of lens dies, and the die roller having peripheral Fresnel facet dies, the peripheral lens dies providing, as the blank roller and the die roller rotate through one complete revolution, for the extrusion of the first or inner lens subsegment and the second or outer lens subsegment, and the Fresnel facet dies providing, as the blank roller and the die roller rotate through one complete revolution, for the impression of curved Fresnel facet grooves in the first or inner lens subsegment and the second or outer lens subsegment such that when the first or inner lens subsegment first outer edge is fitted to the second or outer lens subsegment second inner edge the Fresnel facet grooves of the first or inner lens subsegment and the second or outer lens subsegment have a common center of curvature;

c) roller support structure; and d) roller drive mechanism.

28. Roller extruder as recited in claim 27 further comprising a third roller.

29. Roller extruder for manufacturing Fresnel lens angular lens segments comprising a pair of lens subsegments, a first or inner lens subsegment and a second or outer lens subsegment, the first or inner lens subsegment having a first outer edge and the second or outer lens subsegment having a second inner edge, each lens subsegment having a front subsegment surface and a rear subsegment surface, the roller extruder comprising:

a) second die roller having peripheral second Fresnel facet dies;

b) first die roller having a first roller inner edge and a first roller outer edge, having one or more pairs of peripheral lens dies, each pair comprising a first lens die and a second lens die which are proximally joined proximal to the first roller inner edge, each pair being spaced equidistant around the periphery of the die roller, and each pair having a primary angular displacement approximately equal to three hundred sixty degrees divided by the total number of lens dies, and the first die roller having peripheral first Fresnel facet dies, the peripheral lens dies providing, as the first die roller and the second die roller rotate through one complete revolution, for the extrusion of the first or inner lens subsegment and the second or outer lens subsegment, and the first Fresnel facet dies and the second Fresnel facet dies respectively providing, as the first die roller and the second die roller rotate through one complete revolution, for the impression of curved Fresnel facet grooves in the surfaces of the first or inner lens subsegment and the second or outer lens subsegment such that when the first or inner lens subsegment first outer edge is fitted to the second or outer lens subsegment second inner edge the Fresnel facet grooves of both surfaces of the first or inner lens subsegment and the second or outer lens subsegment have a common center of curvature;

c) roller support structure; and d) roller drive mechanism.

30. Roller extruder as recited in claim 29 further comprising a third roller.

31. Method for manufacturing Fresnel lens angular lens segments comprising a pair of lens subsegments, a first or inner lens subsegment and a second or outer lens subsegment, the first or inner lens subsegment having a first outer edge and the second or outer lens subsegment having a second inner edge, the method comprising:
  a) feeding raw plastic sheet to a roller extruder having a blank roller and a die roller, the die roller having a first roller inner edge and a first roller outer edge and having two peripheral lens dies, the two peripheral lens dies comprising a first lens die and a second lens die, the first lens die and the second lens die being proximally joined proximal to the first roller inner edge and have a primary angular displacement of approximately one hundred eighty degrees proximal to the first roller outer edge, and the die roller having peripheral Fresnel facet dies; and
  b) extruding, for a revolution of the die roller, the angular lens segment, the angular lens segment comprising a first or inner lens subsegment and a second or outer lens subsegment, the first or inner lens subsegment and the second or outer lens subsegment respectively being impressed between the first lens die and the second lens die, the first or inner lens subsegment having its minimum circumferential dimension proximal to the die junction and it maximum circumferential dimension proximal to the first roller outer edge where the primary angular displacement is approximately one hundred eighty degrees, and the second or outer lens subsegment having its minimum circumferential dimension proximal to the first roller outer edge where the first lens die and the second lens die have a reverse angular displacement of approximately one hundred eighty degrees and its maximum circumferential dimension proximal to the first roller inner edge wherein the first lens die and the second lens die have a maximum reverse angular displacement, and the Fresnel facet dies impressing curved Fresnel facet grooves on the first or inner lens subsegment and the second or outer lens subsegment such that when the first or inner lens subsegment first outer edge is fitted to the second or outer lens subsegment second inner edge the Fresnel facet grooves of the first or inner lens subsegment and the second or outer lens subsegment have a common center of curvature.

32. Method for manufacturing Fresnel lens angular lens segments comprising a pair of lens subsegments, a first or inner lens subsegment and a second or outer lens subsegment, the first or inner lens subsegment having a first outer edge and the second or outer lens subsegment having a second inner edge, the method comprising:
  a) feeding raw plastic sheet to a roller extruder having a blank roller and a die roller, the die roller having a first roller inner edge and a first roller outer edge, having two peripheral lens dies, the two peripheral lens dies comprising a first lens die having a first die end and a second lens die having a second die end, and the die roller having peripheral Fresnel facet dies, the first lens die and the second lens die being proximally joined at a die junction which is proximal to the first roller inner edge, and the first lens die and the second lens die being angularly separated by a primary angular displacement which increases approximately linearly with longitudinal distance from the die junction to the first die end and the second die end, the first die end and the second die end being proximal to the first roller outer edge, and the primary angular displacement between the first die end and the second die end being approximately one hundred eighty degrees; and
  b) extruding, for a revolution of the die roller, the angular lens segment, the angular lens segment comprising a first or inner lens subsegment and a second or outer lens subsegment, the first or inner lens subsegment and the second or outer lens subsegment respectively being impressed between the first lens die and the second lens die, the first or inner lens subsegment having its minimum circumferential dimension proximal to the die junction and it maximum circumferential dimension proximal to the first roller outer edge where the primary angular displacement is approximately one hundred eighty degrees, and the second or outer lens subsegment having its minimum circumferential dimension proximal to the first roller outer edge where the first lens die and the second lens die have a reverse angular displacement of approximately one hundred eighty degrees and its maximum circumferential dimension proximal to the first roller inner edge wherein the first lens die and the second lens die have a maximum reverse angular displacement, and the Fresnel facet dies impressing curved Fresnel facet grooves on the first or inner lens subsegment and the second or outer lens subsegment such that when the first or inner lens subsegment first outer edge is fitted to the second or outer lens subsegment second inner edge the Fresnel facet grooves of the first or inner lens subsegment and the second or outer lens subsegment have a common center of curvature.

33. Method for manufacturing Fresnel lens angular lens segments comprising a pair of lens subsegments, a first or inner lens subsegment and a second or outer lens subsegment, the first or inner lens subsegment having a first outer edge and the second or outer lens subsegment having a second inner edge, each lens subsegment having a front subsegment surface and a rear subsegment surface, the method comprising:
  a) feeding raw plastic sheet to a roller extruder having a first die roller and a second die roller, the first die roller having a first roller inner edge and a first roller outer edge, having two peripheral lens dies, a first lens die and a second lens die, which are proximally joined at a die junction proximal to the first roller inner edge and have a primary angular displacement of approximately one hundred eighty degrees proximal to the first roller outer edge, and the first die roller having peripheral first Fresnel facet dies, and the second die roller having peripheral second Fresnel facet dies; and
  b) extruding, for a revolution of the first die roller and the second die roller, the angular lens segment, the angular lens segment comprising a first or inner lens subsegment and a second or outer lens subsegment, the first or inner lens subsegment and the second or outer lens subsegment respectively being impressed between the first lens die and the second lens die, the first or inner lens subsegment having its minimum circumferential dimension proximal to the die junction and it maximum circumferential dimension proximal to the first roller outer edge where the primary angular displacement is approximately one hundred eighty degrees, and the second or outer lens subsegment having its minimum circumferential dimension proximal to the first roller outer edge where the first lens die and the second lens die have a reverse angular displacement of approximately one hundred eighty degrees and its maximum circumferential dimension proximal to the first roller inner edge wherein the first lens die and the second lens die have a maximum reverse angular displacement, and the first Fresnel facet dies impressing curved first Fresnel facet grooves on the outer segment surface of the first or inner lens subsegment and the second or outer lens subsegment of the angular lens segment, and the second Fresnel facet dies impressing curved second Fresnel facet grooves on an inner segment surface of the first or inner lens subsegment and the second or outer lens subsegment such that when the first or inner lens subsegment first outer edge is fitted to the second or outer lens subsegment second inner edge the Fresnel facet grooves of both surfaces of the first or inner lens subsegment and the second or outer lens subsegment have a common center of curvature.

34. Method for manufacturing Fresnel lens angular lens segments comprising a pair of lens subsegments, a first or inner lens subsegment and a second or outer lens subsegment, the first or inner lens subsegment having a first outer edge and the second or outer lens subsegment having a second inner edge, each lens subsegment having a front subsegment surface and a rear subsegment surface, the method comprising:
    a) feeding raw plastic sheet to a roller extruder having a first die roller and a second die roller, the first die roller having a first roller inner edge and a first roller outer edge, having two peripheral lens dies, a first lens die having a first die end and a second lens die having a second die end, and the first die roller having peripheral first Fresnel facet dies, the first lens die and the second lens die being proximally joined at a die junction which is proximal to the first roller inner edge, and the first lens die and the second lens die being angularly separated by a primary angular displacement which increases approximately linearly with longitudinal distance from the die junction to the first die end and the second die end, the first die end and the second die end being proximal to the first roller outer edge, and the primary angular displacement between the first die end and the second die end being approximately one hundred eighty degrees, and having peripheral first Fresnel facet dies, and the second die roller having peripheral second Fresnel facet dies; and
    b) extruding, for a revolution of the die roller, the angular lens segment, the angular lens segment comprising a first or inner lens subsegment and a second or outer lens subsegment, the first or inner lens subsegment and the second or outer lens subsegment respectively being impressed between the first lens die and the second lens die, the first or inner lens subsegment having its minimum circumferential dimension proximal to the die junction and it maximum circumferential dimension proximal to the first roller outer edge where the primary angular displacement is approximately one hundred eighty degrees, and the second or outer lens subsegment having its minimum circumferential dimension proximal to the first roller outer edge where the first lens die and the second lens die have a reverse angular displacement of approximately one hundred eighty degrees and its maximum circumferential dimension proximal to the first roller inner edge wherein the first lens die and the second lens die have a maximum reverse angular displacement, and the first Fresnel facet dies impressing curved first Fresnel facet grooves on the outer segment surface of the first or inner lens subsegment and the second or outer lens subsegment of the angular lens segment, and the second Fresnel facet dies impressing curved second Fresnel facet grooves on an inner segment surface of the first or inner lens subsegment and the second or outer lens subsegment such that when the first or inner lens subsegment first outer edge is fitted to the second or outer lens subsegment second inner edge the Fresnel facet grooves of both surfaces of the first or inner lens subsegment and the second or outer lens subsegment have a common center of curvature.

35. Method for manufacturing Fresnel lens angular segments comprising a pair of lens subsegments, a first or inner lens subsegment and a second or outer lens subsegment, the first or inner lens subsegment having a first outer edge and the second or outer lens subsegment having a second inner edge, the method comprising:
    a) feeding raw plastic sheet to a roller extruder having a blank roller and a die roller, the die roller having two peripheral lens dies, the two peripheral lens dies comprising a first lens die and a second lens die, the first lens die and the second lens die being proximally joined proximal to the first roller inner edge and have a primary angular displacement of approximately one hundred eighty degrees proximal to the first roller outer edge, and the die roller having peripheral Fresnel facet dies;
    b) forming and extruding, for each successive revolution of the die roller, an extruded lens wafer from the raw plastic sheet, and impressing in the lens wafer by the lens dies for each revolution of the die rollers, an angular lens segment from the lens wafer, the angular lens segment comprising a first or inner lens subsegment and a second or outer lens subsegment, the lens dies impressing the first or inner lens subsegment and the second or outer lens subsegment as the die roller makes the complete revolution, the first or inner lens subsegment and the second or outer lens subsegment being impressed in an inverted position with respect to each other in the lens wafer, the Fresnel facet dies impressing curved Fresnel facet grooves in the first or inner lens subsegment and the second or outer lens subsegment such that when the first or inner lens subsegment first outer edge is fitted to the second or outer lens subsegment second inner edge the Fresnel facet grooves of the first or inner lens subsegment and the second or outer lens subsegment have a common center of curvature.

36. Method for manufacturing Fresnel lens angular segments comprising a pair of lens subsegments, a first or inner lens subsegment and a second or outer lens subsegment, the first or inner lens subsegment having a first outer edge and the second or outer lens subsegment having a second inner edge, each lens subsegment having a front subsegment surface and a rear subsegment surface, the method comprising:
    a) feeding raw plastic sheet to a roller extruder having a first die roller and a second die roller, the first die roller having two peripheral lens dies which are proximally joined at a die junction proximal to the first roller inner edge and have a primary angular displacement of approximately one hundred eighty degrees proximal to the first roller outer edge, and the first die roller having peripheral first Fresnel facet dies, and the second die roller having peripheral second Fresnel facet dies; and
    b) forming and extruding, for each successive revolution of the die rollers, an extruded lens wafer from the raw plastic sheet, and impressing in the lens wafer by the lens dies for each revolution of the die rollers, an angular lens segment from the lens wafer, the angular lens segment comprising a first or inner lens subsegment and a second or outer lens subsegment, the lens dies impressing the first or inner lens subsegment and the second or outer lens subsegment as the die roller makes the complete revolution, the first or inner lens subsegment and the second or outer lens subsegment being impressed in an inverted position with respect to each other in the lens wafer, the first Fresnel facet dies and the second Fresnel facet dies impressing curved Fresnel facet grooves on opposing surfaces of the first or inner lens subsegment and the second or outer lens subsegment such that when the first or inner lens subsegment first outer edge is fitted to the second or outer lens subsegment second inner edge the Fresnel facet grooves of the first or inner lens subsegment and the second or outer lens subsegment have a common center of curvature.

37. Method for manufacturing a Fresnel lens angular lens segment comprising:
   a) feeding raw plastic sheet to a roller extruder having a blank roller and a die roller, the die roller having a pair of generally longitudinal peripheral lens dies; and peripheral Fresnel facet dies; and
   b) extruding, for a revolution of the die roller, the angular lens segment, the angular lens segment comprising a first or inner lens subsegment and a second or outer lens subsegment, the first or inner lens subsegment having a first inner edge with a first inner generally circumferential dimension, a first outer edge with a first outer generally circumferential dimension, a first left edge with a first left dimension and a first right edge with a first right dimension, the second or outer lens subsegment having a second inner edge with a second inner generally circumferential dimension, a second outer edge with a second outer generally circumferential dimension, a second left edge with a second left dimension, and a second right edge with a second right dimension, the first outer generally circumferential dimension being roughly equal to the second inner generally circumferential dimension providing for the second or outer lens subsegment to fit against the first or inner lens subsegment with the second inner edge fitting against the first outer edge for assembly of an angular lens segment, the generally longitudinal peripheral lens dies impressing the first left edge, the first right edge, the second left edge and the second right edge, the end lens dies impressing the first inner edge, the first outer edge, the second inner edge and the second outer edge, and the Fresnel facet dies impressing curved Fresnel facet grooves on the first or inner lens subsegment and the second or outer lens subsegment such that when the first or inner lens subsegment first outer edge is fitted to the second or outer lens subsegment second inner edge the Fresnel facet grooves of the first or inner lens subsegment and the second or outer lens subsegment have a common center of curvature.

38. Method for manufacturing Fresnel lens angular segments comprising:
   a) feeding raw plastic sheet to a roller extruder having a blank roller and a die roller, the die roller having a generally circumferential lens die, a longitudinal peripheral lens die, and peripheral Fresnel facet dies; and
   b) extruding, for a revolution of the die roller, the angular lens segment, the angular lens segment comprising a first or inner lens subsegment and a second or outer lens subsegment, the first or inner lens subsegment having a first inner edge with a first inner generally circumferential dimension, a first outer edge with a first outer generally circumferential dimension, a first left edge with a first left dimension and a first right edge with a first right dimension, the second or outer lens subsegment having a second inner edge with a second inner generally circumferential dimension, a second outer edge with a second outer generally circumferential dimension, a second left edge with a second left dimension, and a second right edge with a second right dimension, the first outer generally circumferential dimension being roughly equal to the second inner generally circumferential dimension providing for the second or outer lens subsegment to fit against the first or inner lens subsegment with the second inner edge fitting against the first outer edge for assembly of an angular lens segment, the generally circumferential peripheral lens dies impressing the first left edge and the second left edge, the longitudinal lens die impressing the first inner edge, the first outer edge, the second inner edge and the second outer edge, and the Fresnel facet dies impressing curved Fresnel facet grooves on the first or inner lens subsegment and the second or outer lens subsegment such that when the first or inner lens subsegment first outer edge is fitted to the second or outer lens subsegment second inner edge the Fresnel facet grooves of the first or inner lens subsegment and the second or outer lens subsegment have a common center of curvature.

39. Method for manufacturing Fresnel lens angular lens segments comprising:
   a) feeding raw plastic sheet to a roller extruder having a first die roller and a second die roller, the first die roller having a pair of generally longitudinal peripheral lens dies, and peripheral first Fresnel facet dies, and the second die roller having peripheral second Fresnel facet dies; and
   b) extruding, for a revolution of the die rollers, the angular lens segment, the angular lens segment comprising a first or inner lens subsegment and a second or outer lens subsegment, the first or inner lens subsegment having a first inner edge with a first inner generally circumferential dimension, a first outer edge with a first outer generally circumferential dimension, a first left edge with a first left dimension and a first right edge with a first right dimension, the second or outer lens subsegment having a second inner edge with a second inner generally circumferential dimension, a second outer edge with a second outer generally circumferential dimension, a second left edge with a second left dimension, and a second right edge with a second right dimension, the first outer generally circumferential dimension being roughly equal to the second inner generally circumferential dimension providing for the second or outer lens subsegment to fit against the first or inner lens subsegment with the second inner edge fitting against the first outer edge for assembly of an angular lens segment, the generally longitudinal peripheral lens dies impressing the first left edge, the first right edge, the second left edge and the second right edge, the end lens dies impressing the first inner edge, the first outer edge, the second inner edge and the second outer edge, and the first Fresnel facet dies impressing curved first Fresnel facet grooves on a front surface of the first or inner lens subsegment and the second or outer lens subsegment and the second Fresnel facet dies impressing curved second Fresnel facet grooves on a rear surface of the first or inner lens subsegment and the second or outer lens subsegment, such that when the first or inner lens subsegment first outer edge is fitted to the second or outer lens subsegment second inner edge the Fresnel facet grooves of the first or inner lens subsegment and the second or outer lens subsegment have a common center of curvature.

40. Method for manufacturing Fresnel lens angular segments comprising:

a) feeding raw plastic sheet to a roller extruder having a first die roller and a second die roller, the first die roller having a generally circumferential lens die, a longitudinal peripheral lens die, and peripheral first Fresnel facet dies, and the second die roller having peripheral second Fresnel facet dies; and b) extruding, for a revolution of the die roller, the angular lens segment, the angular lens segment comprising a first or inner lens subsegment and a second or outer lens subsegment, the first or inner lens subsegment having a first inner edge with a first inner generally circumferential dimension, a first outer edge with a first outer generally circumferential dimension, a first left edge with a first left dimension and a first right edge with a first right dimension, the second or outer lens subsegment having a second inner edge with a second inner generally circumferential dimension, a second outer edge with a second outer generally circumferential dimension, a second left edge with a second left dimension, and a second right edge with a second right dimension, the first outer generally circumferential dimension being roughly equal to the second inner generally circumferential dimension providing for the second or outer lens subsegment to fit against the first or inner lens subsegment with the second inner edge fitting against the first outer edge for assembly of an angular lens segment, the generally circumferential peripheral lens dies impressing the first left edge and the second left edge, the longitudinal lens die impressing the first inner edge, the first outer edge, the second inner edge and the second outer edge, and the first Fresnel facet dies impressing curved first Fresnel facet grooves on a front surface of the first or inner lens subsegment and the second or outer lens subsegment and the second Fresnel facet dies impressing curved second Fresnel facet grooves on a rear surface of the first or inner lens subsegment and the second or outer lens subsegment, such that when the first or inner lens subsegment first outer edge is fitted to the second or outer lens subsegment second inner edge the Fresnel facet grooves of the first or inner lens subsegment and the second or outer lens subsegment have a common center of curvature.

* * * * *

UNITED STATES PATENT AND TRADEMARK OFFICE
CERTIFICATE OF CORRECTION

PATENT NO. : 7,789,651 B2  
APPLICATION NO. : 11/827399  
DATED : September 7, 2010  
INVENTOR(S) : Johnson It is certified that error appears in the above-identified patent and that said Letters Patent is hereby corrected as shown below:

Title page

Item (54) Title:, and Specification, column 1, line 1, Delete "PRESNEL" and insert --FRESNEL--.

Signed and Sealed this  
Eighth Day of March, 2016

Michelle K. Lee  
*Director of the United States Patent and Trademark Office*